(12) United States Patent
Bhathija et al.

(10) Patent No.: US 8,847,088 B2
(45) Date of Patent: Sep. 30, 2014

(54) COVER MOUNTED HANDLE OPERATING MECHANISM WITH INTEGRATED INTERLOCK ASSEMBLY FOR A BUSPLUG ENCLOSURE

(75) Inventors: Kuldeep Kumar Bhathija, Andhra Pradesh (IN); Jeffrey Lynn Cox, Selmer, TN (US); Shravan Purohit, Andhra Pradesh (IN); Steven English Richard, Selmer, TN (US); Clarence Wilson Walker, Selmer, TN (US)

(73) Assignee: General Electric Company, Schenectady, NY (US)

( * ) Notice: Subject to any disclaimer, the term of this patent is extended or adjusted under 35 U.S.C. 154(b) by 416 days.

(21) Appl. No.: 13/239,559

(22) Filed: Sep. 22, 2011

(65) Prior Publication Data

US 2013/0075239 A1 Mar. 28, 2013

(51) Int. Cl.
*H01H 9/20* (2006.01)
*H01H 9/22* (2006.01)

(52) U.S. Cl.
CPC .................................... *H01H 9/22* (2013.01)
USPC ...................................... 200/293; 200/50.02

(58) Field of Classification Search
CPC ........... H01H 1/226; H01H 1/50; H01H 1/24; H01H 9/34; H01H 9/46; H01H 33/02; H01H 71/52; H01H 71/0207
USPC ................................................. 200/293, 333
See application file for complete search history.

(56) References Cited

U.S. PATENT DOCUMENTS

| | | | |
|---|---|---|---|
| 3,212,741 A | 10/1965 | Ericson |
| 3,365,537 A | 1/1968 | Fehr et al. |
| 3,376,377 A | 4/1968 | Fehr, Jr. |
| 3,377,421 A | 4/1968 | Ericson |
| 3,382,331 A | 5/1968 | Jencks et al. |
| 3,384,702 A | 5/1968 | Stevens |
| 3,391,378 A | 7/1968 | Fisher |
| 3,395,378 A | 7/1968 | Ericson |
| 3,401,230 A | 9/1968 | Giger, Jr. |
| 3,422,387 A | 1/1969 | Sprigings et al. |
| RE26,576 E | 4/1969 | Kurt et al. |
| 3,485,936 A | 12/1969 | Goodridge |
| 3,488,621 A | 1/1970 | Stevens |
| 3,489,846 A | 1/1970 | Fehr, Jr. |
| 3,489,983 A | 1/1970 | Ericson et al. |
| 3,524,050 A | 8/1970 | Gustine |
| 3,609,215 A | 9/1971 | Giger et al. |
| 3,625,233 A | 12/1971 | Southard |
| 3,681,509 A | 8/1972 | Johnston et al. |
| 3,818,417 A | 6/1974 | Koenig et al. |
| 3,820,057 A | 6/1974 | Joly |

(Continued)

*Primary Examiner* — Renee Luebke
*Assistant Examiner* — Lheiren Mae A Caroc
(74) *Attorney, Agent, or Firm* — Cantor Colburn LLP

(57) ABSTRACT

A busplug enclosure includes a body member includes a plurality of wall members that collectively define an interior chamber having an opening. The body member includes a line portion and a load portion. A cover assembly is mounted to the body member across the opening. The cover assembly includes a first cover member spanning the load portion and a second cover member spanning the line portion. A handle operating mechanism is mounted to the cover assembly. The handle operating mechanism includes a handle member configured to rotate about an axis extending through the cover assembly, a cam member and a slider member. The handle member is operatively coupled to the cam member and the slider member and configured and disposed to move between a first position and a second position.

14 Claims, 5 Drawing Sheets

(56) References Cited

U.S. PATENT DOCUMENTS

| | | |
|---|---|---|
| 3,848,102 A | 11/1974 | Jencks et al. |
| 3,882,265 A | 5/1975 | Johnston et al. |
| 3,888,336 A | 6/1975 | Zajic |
| 3,956,574 A | 5/1976 | Weimer |
| 3,970,808 A | 7/1976 | Gryctko et al. |
| 3,976,853 A | 8/1976 | Trattner et al. |
| 3,987,877 A | 10/1976 | Bulanchuk |
| 4,000,478 A * | 12/1976 | Jencks et al. ............... 335/34 |
| 4,009,920 A | 3/1977 | Hicks et al. |
| 4,010,997 A | 3/1977 | Bulanchul |
| 4,097,103 A | 6/1978 | Krause |
| 4,134,633 A | 1/1979 | Krause et al. |
| 4,146,285 A | 3/1979 | Cook |
| 4,173,383 A | 11/1979 | Lee |
| 4,195,198 A | 3/1980 | Krause |
| 4,262,163 A | 4/1981 | Durrell et al. |
| 4,413,307 A | 11/1983 | Butte et al. |
| 4,427,852 A | 1/1984 | Wolniak et al. |
| 4,566,167 A | 1/1986 | Wolniak et al. |
| 4,603,313 A | 7/1986 | Shimp et al. |
| 4,604,505 A | 8/1986 | Henninger |
| 4,620,758 A | 11/1986 | Frola |
| 4,627,680 A | 12/1986 | Weimer et al. |
| 4,673,229 A | 6/1987 | Jorgensen et al. |
| 4,705,334 A | 11/1987 | Slicer et al. |
| 4,714,431 A | 12/1987 | McGoldrick et al. |
| 4,758,172 A | 7/1988 | Richards et al. |
| 4,804,804 A | 2/1989 | Hibbert et al. |
| 4,820,177 A | 4/1989 | Slicer |
| 4,820,178 A | 4/1989 | Anderson et al. |
| 4,842,533 A | 6/1989 | Beberman et al. |
| 4,849,581 A | 7/1989 | Larkin et al. |
| 4,866,216 A | 9/1989 | Slicer |
| 4,886,468 A | 12/1989 | Harton et al. |
| 4,912,599 A | 3/1990 | Wittmer |
| 4,929,801 A | 5/1990 | Hibbert |
| 4,950,841 A | 8/1990 | Walker et al. |
| 4,957,447 A | 9/1990 | Hibbert et al. |
| 4,973,927 A * | 11/1990 | Carothers et al. ............... 335/10 |
| 4,979,906 A | 12/1990 | Shrout et al. |
| 5,011,421 A | 4/1991 | Duke et al. |
| 5,048,995 A | 9/1991 | Beaulieu |
| 5,053,637 A | 10/1991 | Dillard |
| 5,055,059 A | 10/1991 | Logstrup |
| 5,068,763 A | 11/1991 | Brown et al. |
| 5,094,276 A | 3/1992 | Caputo et al. |
| 5,122,072 A | 6/1992 | Arn et al. |
| 5,151,043 A | 9/1992 | Morgan |
| 5,192,217 A | 3/1993 | Wittmer |
| 5,196,987 A | 3/1993 | Webber et al. |
| 5,214,314 A | 5/1993 | Dillard et al. |
| 5,401,906 A | 3/1995 | Bryant |
| 5,415,557 A | 5/1995 | Chapman et al. |
| 5,442,135 A | 8/1995 | Faulkner et al. |
| 5,449,056 A | 9/1995 | Ross |
| 5,466,889 A | 11/1995 | Faulkner et al. |
| 5,486,651 A | 1/1996 | Morgan |
| 5,493,084 A | 2/1996 | Whitaker et al. |
| 5,505,630 A | 4/1996 | Petrisko et al. |
| 5,525,068 A | 6/1996 | Graham et al. |
| 5,584,716 A | 12/1996 | Bergman |
| 5,587,874 A | 12/1996 | Hoppensteadt et al. |
| 5,619,014 A | 4/1997 | Faulkner |
| 5,760,339 A | 6/1998 | Faulkner et al. |
| 5,783,779 A | 7/1998 | Graham et al. |
| 5,789,709 A | 8/1998 | Luers et al. |
| 5,811,733 A | 9/1998 | Flaig |
| 5,821,464 A | 10/1998 | Graham et al. |
| 5,828,006 A | 10/1998 | Graham et al. |
| 5,854,445 A | 12/1998 | Graham et al. |
| 5,895,279 A | 4/1999 | Petrisko et al. |
| 6,023,030 A | 2/2000 | Latimer et al. |
| 6,065,206 A | 5/2000 | West |
| 6,105,741 A | 8/2000 | Ross |
| 6,142,807 A | 11/2000 | Faulkner |
| 6,146,169 A | 11/2000 | Calder et al. |
| 6,180,885 B1 | 1/2001 | Goldman et al. |
| 6,201,180 B1 | 3/2001 | Meyer et al. |
| 6,265,666 B1 | 7/2001 | Faulkner |
| 6,285,014 B1 | 9/2001 | Beck et al. |
| 6,296,498 B1 | 10/2001 | Ross |
| 6,300,767 B1 | 10/2001 | Kliman et al. |
| 6,329,598 B1 | 12/2001 | M'Sadoques et al. |
| 6,329,810 B1 | 12/2001 | Reid |
| 6,359,225 B1 | 3/2002 | West |
| 6,399,882 B1 | 6/2002 | Faulkner et al. |
| 6,448,515 B1 | 9/2002 | Rohmer et al. |
| 6,517,363 B2 | 2/2003 | Ross |
| 6,521,837 B2 | 2/2003 | Hilgert et al. |
| 6,702,254 B2 | 3/2004 | Noble et al. |
| D499,698 S | 12/2004 | Ramirez |
| 6,835,104 B2 | 12/2004 | West et al. |
| 6,867,373 B2 | 3/2005 | West et al. |
| 7,015,403 B2 * | 3/2006 | Houck et al. ............... 200/50.05 |
| 7,084,520 B2 | 8/2006 | Zambrano et al. |
| 7,091,417 B1 | 8/2006 | Jur et al. |
| 7,215,039 B2 | 5/2007 | Zambrano et al. |
| 7,311,538 B2 | 12/2007 | West |
| 7,330,096 B2 | 2/2008 | Shah et al. |
| 7,367,830 B2 | 5/2008 | Jur et al. |
| 7,420,132 B2 | 9/2008 | Jur et al. |
| 7,468,488 B1 | 12/2008 | Hilgert |
| 7,470,861 B1 | 12/2008 | Ross et al. |
| 7,492,057 B2 | 2/2009 | Baldwin et al. |
| 7,495,876 B2 | 2/2009 | Dunne et al. |
| 7,517,235 B2 | 4/2009 | Bagewadi et al. |
| 7,557,309 B2 | 7/2009 | Ross et al. |
| 7,614,895 B2 | 11/2009 | Jur et al. |
| 7,744,386 B1 | 6/2010 | Speidel et al. |
| 7,786,382 B2 | 8/2010 | Burguera |
| 7,819,681 B1 | 10/2010 | Rodrigues et al. |
| 7,830,648 B2 | 11/2010 | Strong et al. |
| 7,862,356 B1 | 1/2011 | O'Leary et al. |
| 2001/0043062 A1 | 11/2001 | Reid |
| 2002/0046864 A1 | 4/2002 | Bellino et al. |
| 2002/0078166 A1 | 6/2002 | Motley et al. |
| 2002/0117322 A1 | 8/2002 | Hilgert et al. |
| 2003/0003785 A1 | 1/2003 | Ross |
| 2003/0076212 A1 | 4/2003 | Shah et al. |
| 2003/0230426 A1 | 12/2003 | West et al. |
| 2003/0232532 A1 | 12/2003 | West et al. |
| 2005/0088790 A1 | 4/2005 | Shah et al. |
| 2005/0150677 A1 | 7/2005 | Hochstim et al. |
| 2005/0229994 A1 | 10/2005 | Turkia |
| 2005/0233625 A1 | 10/2005 | Faulkner |
| 2005/0242590 A1 | 11/2005 | Zambrano et al. |
| 2006/0097578 A1 | 5/2006 | Baldwin et al. |
| 2006/0170222 A1 | 8/2006 | Zambrano et al. |
| 2007/0066110 A1 | 3/2007 | West |
| 2007/0212932 A1 | 9/2007 | Jur et al. |
| 2008/0013596 A1 | 1/2008 | Dunne et al. |
| 2008/0124960 A1 | 5/2008 | Jur et al. |
| 2008/0160812 A1 | 7/2008 | Bagewadi et al. |
| 2008/0302553 A1 | 12/2008 | Ross et al. |
| 2008/0302566 A1 | 12/2008 | Ross et al. |
| 2008/0302567 A1 | 12/2008 | Hilgert |
| 2009/0145625 A1 | 6/2009 | Bhathija et al. |
| 2009/0178824 A1 | 7/2009 | Burguera |
| 2009/0191739 A1 | 7/2009 | Jur et al. |
| 2009/0196012 A1 | 8/2009 | Jur et al. |
| 2010/0012187 A1 | 1/2010 | Paull et al. |
| 2010/0012375 A1 | 1/2010 | Jur et al. |
| 2010/0059276 A1 | 3/2010 | Bhathija et al. |
| 2010/0147360 A1 | 6/2010 | Morse et al. |
| 2010/0177464 A1 | 7/2010 | Strong et al. |
| 2010/0229475 A1 | 9/2010 | Myers et al. |
| 2010/0263901 A1 | 10/2010 | Doring et al. |
| 2010/0319954 A1 | 12/2010 | Ramsey |
| 2010/0319958 A1 | 12/2010 | Latimer |

* cited by examiner

COVER MOUNTED HANDLE OPERATING MECHANISM WITH INTEGRATED INTERLOCK ASSEMBLY FOR A BUSPLUG ENCLOSURE

BACKGROUND OF THE INVENTION

The subject matter disclosed herein relates to the art of busplug enclosures and, more particularly, to a cover mounted handle operating mechanism for a busplug enclosure.

Electric power bus systems are typically employed to deliver/distribute electrical power to various loads. Generally, bus systems include a number of branch circuits that are connected to a main electrical distribution panel. Often times there exist electrical disconnects in the branch circuits. The electrical disconnects are operated to electrically isolate an electrical load from the main distribution panel or other source of electrical power. The electrical disconnects are generally arranged in an enclosure that houses switching components. The enclosure generally includes an external switching mechanism that allows personnel to operate the switching components. In conventional enclosures, the external switching mechanism takes the form of a toggle switch/lever. The toggle switch/lever is generally mounted to a side, or bottom of the enclosure. In addition to operating the switching mechanism, in many cases, the toggle switch/lever also engages/disengages a safety interlock. The interlock prevents the enclosure from being opened when the switching components are in a "power on" configuration, and prevents the switching mechanism from being operated when the enclosure is open.

BRIEF DESCRIPTION OF THE INVENTION

According to one aspect of the exemplary embodiment, A busplug enclosure includes a body member includes a plurality of wall members that collectively define an interior chamber having an opening. The body member includes a line portion and a load portion. A cover assembly is mounted to the body member across the opening. The cover assembly includes a first cover member spanning the load portion and a second cover member spanning the line portion. A handle operating mechanism is mounted to the cover assembly. The handle operating mechanism includes a handle member configured to rotate about an axis extending through the cover assembly, a cam member and a slider member. The handle member is operatively coupled to the cam member and the slider member and configured and disposed to move between a first position and a second position.

According to another aspect of the exemplary embodiment, an electrical disconnect system includes a busplug enclosure including a body member having a plurality of wall members that collectively define an interior chamber provided with an opening. The body member includes a line portion and a load portion. An electrical disconnect is arranged within the interior chamber. The electrical disconnect includes a switching mechanism that is configured to pivot about a first axis between a first position and a second position. A cover assembly is mounted to the body member across the opening. The cover member includes a first cover portion spanning the line portion and a second cover member spanning the load portion. A handle operating mechanism is mounted to the cover assembly. The handle operating mechanism includes a handle member configured to rotate about a second axis extending through the cover assembly, a cam member and a slider member. The handle member is operatively coupled to the cam member and the slider member. The slider member is configured to operatively engage with the electrical disconnect to shift the switching mechanism between the first position and the second position.

According to yet another aspect of the exemplary embodiment, a method of operating an electrical disconnect housed in a busplug enclosure having a cover and a handle member mounted to the cover includes rotating a handle member about a first axis that extends through a cover assembly from a first position to a second position, rotating a cam member operatively coupled to the handle member about the first axis, shifting a slider member operatively coupled to the cam member along a second axis that extends substantially perpendicularly relative to the first axis, and moving a handle operating mechanism operatively coupled to the slider member from one of a connect position and a disconnect position to another of the connect position and the disconnect position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
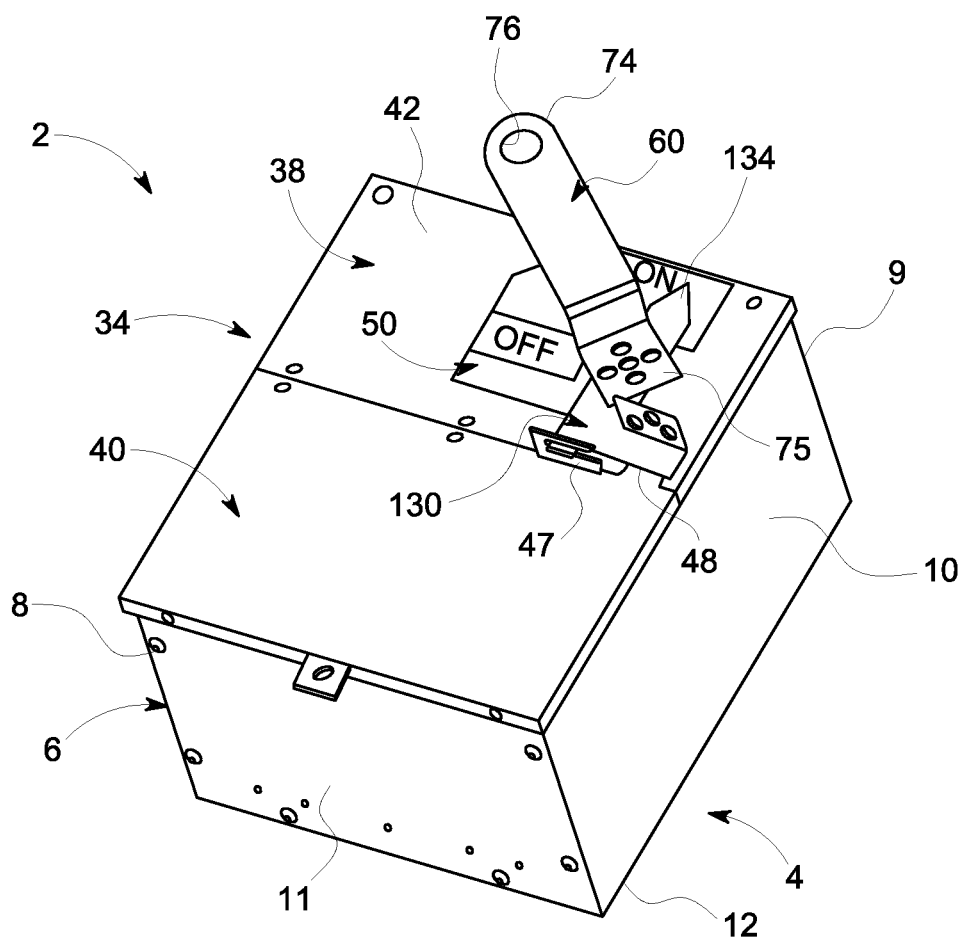
FIG. 1 is a perspective view of a disconnect system including a busplug enclosure having a cover mounted handle operating mechanism in accordance with an exemplary embodiment.
Figure 2:
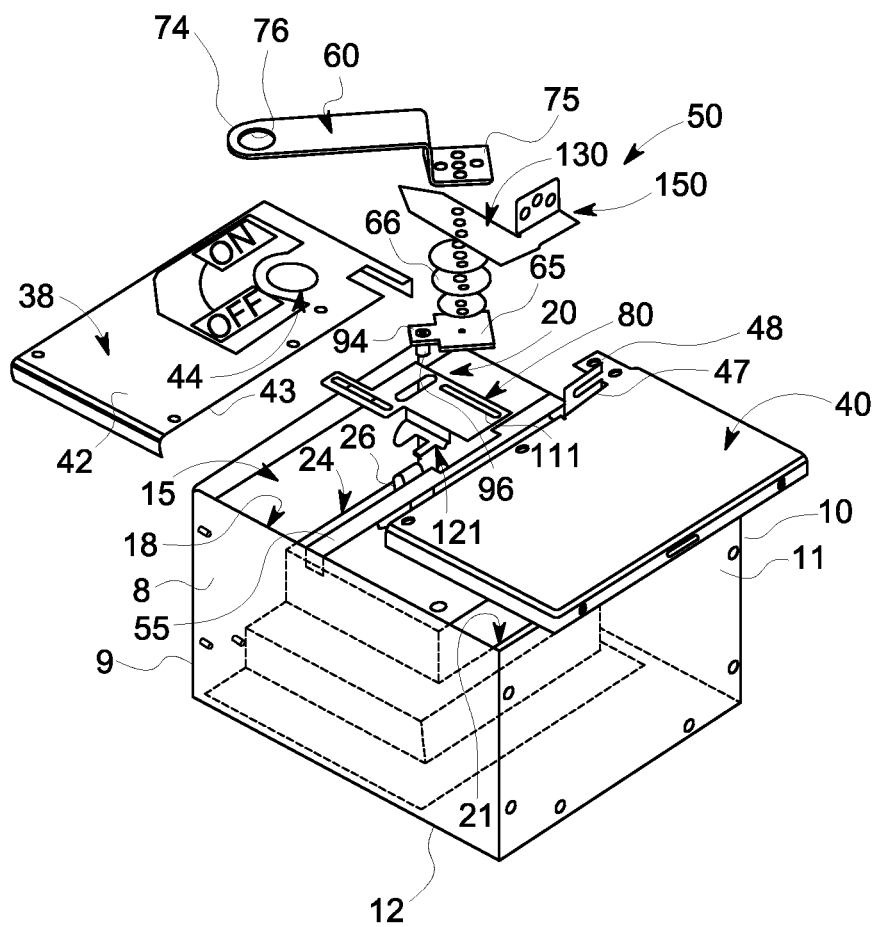
FIG. 2 is an exploded perspective view of the busplug enclosure and handle operating mechanism of FIG. 1.

With reference to FIGS. 1 and 2, an electrical disconnect system in accordance with an exemplary embodiment is indicated generally at 2. Disconnect system 2 includes a busplug enclosure 4 having a body member 6. Body member 6 is formed from a plurality of wall members 8-12 that collectively define an interior chamber 15 having an opening 18. Busplug enclosure 4 includes a line portion 20 and a load portion 21 that are divided by an electrical disconnect 24 including a switching mechanism 26. Line portion 20 receives conductors that are electrically coupled to an electrical source (not shown) and load portion 21 receives conductors that extend to an electrical load (also not shown). Electrical disconnect 24 establishes a connection between the electrical source and the electrical load depending upon a position of switching mechanism 26.

Busplug enclosure 4 also includes a cover assembly 34 that extends across or spans opening 18. Cover assembly 34 includes a first cover member 38 that extends across line portion 20 and a second cover member 40 that extends across load portion 21. First cover member 38 includes an outer surface 42 and an opposing inner surface 43 through which extends an opening 44. Second cover member 40 includes an interlock member 47 and a tab element 48 which, as will be discussed more fully below, prevent access to interior chamber 15 when switching mechanism is in one of a first and second position as established by a handle operating mechanism 50 mounted to first cover member 38. Busplug enclosure 4 also includes a barrier member or support 55 that extends across opening 18. Barrier support 55 includes a plurality of openings (not shown) that are configured to receive mechanical fasteners (also not shown) that extend through and secure first and second cover members 38 and 40 to body member 6.

In accordance with an exemplary embodiment, handle operating mechanism 50 includes a handle member 60 operatively connected to a cam member 65 through a plurality of spacers or bushings one of which is indicated at 66. Handle member 60 is position at outer surface 42 of first cover member 38 and includes a first end 74 that extends to a second end 75. First end 74 includes an opening 76 that facilitates manipulation of handle member 60 when busplug enclosure is mounted in areas not readily accessible. As will be described more fully below, cam member 65 engages a slider member 80 to operate switching mechanism 26.

Figure 3:
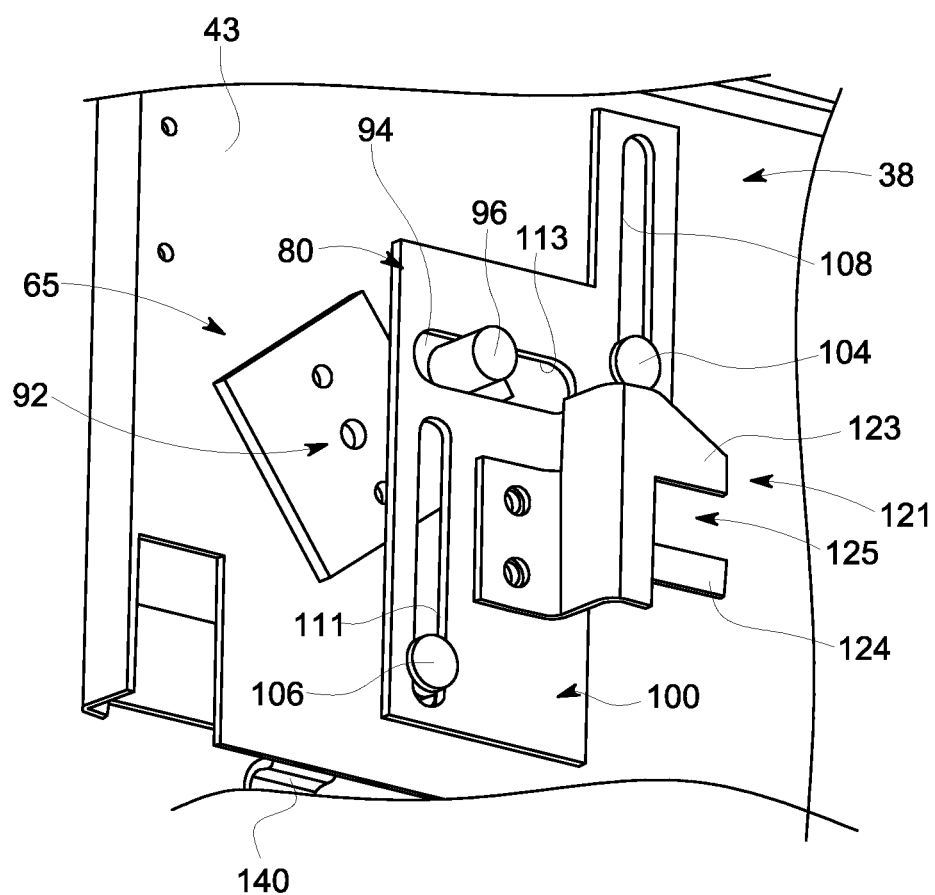
FIG. 3 is perspective view of a portion of the handle operating mechanism FIG. 2.

As best shown in FIG. 3, cam member 65 includes a central mounting section 92 that is coupled to handle member 60 through opening 44. Central mounting section 92 defines a first axis or axis of rotation for both handle member 60 and cam member 65. The first axis extends through first cover member 38. Cam member 65 also includes an off-set arm 94 that is cantilevered from central mounting section 92. Off-set arm 94 supports a post element 96 that operatively engages with slider member 80. More specifically, as cam member 65 rotates about the first axis, post element 96 shifts slider element 80 along a second, axis that extends substantially parallel to first cover member 38. In the exemplary embodiment shown, slider member includes a plate 100 that is moveably mounted to inner surface 43 of first cover member 38 through a pair of guide members or pins 104 and 106. Guide pins 104 and 106 engage with corresponding slots or guides 108 and 110 formed in plate 100. Plate 100 also includes a cam slot or guide 113 that receives post element 96. As handle member 60 rotates about the first axis, off-set arm 94 shifts post element 96 within cam guide 113 causing slider member 80 to shift along the second axis. Movement along the second axis is constrained by guide pins 104 and 106 passing through guides 108 and 110. With this arrangement, a fork member 121 mounted to slider member 80 engages with switching mechanism 26 to operate electrical disconnect 24. Fork member 121 includes first and second arms 123 and 124 that define a notch 125 that receives a toggle element (not separately labeled) of switching mechanism 26.

Figure 4:
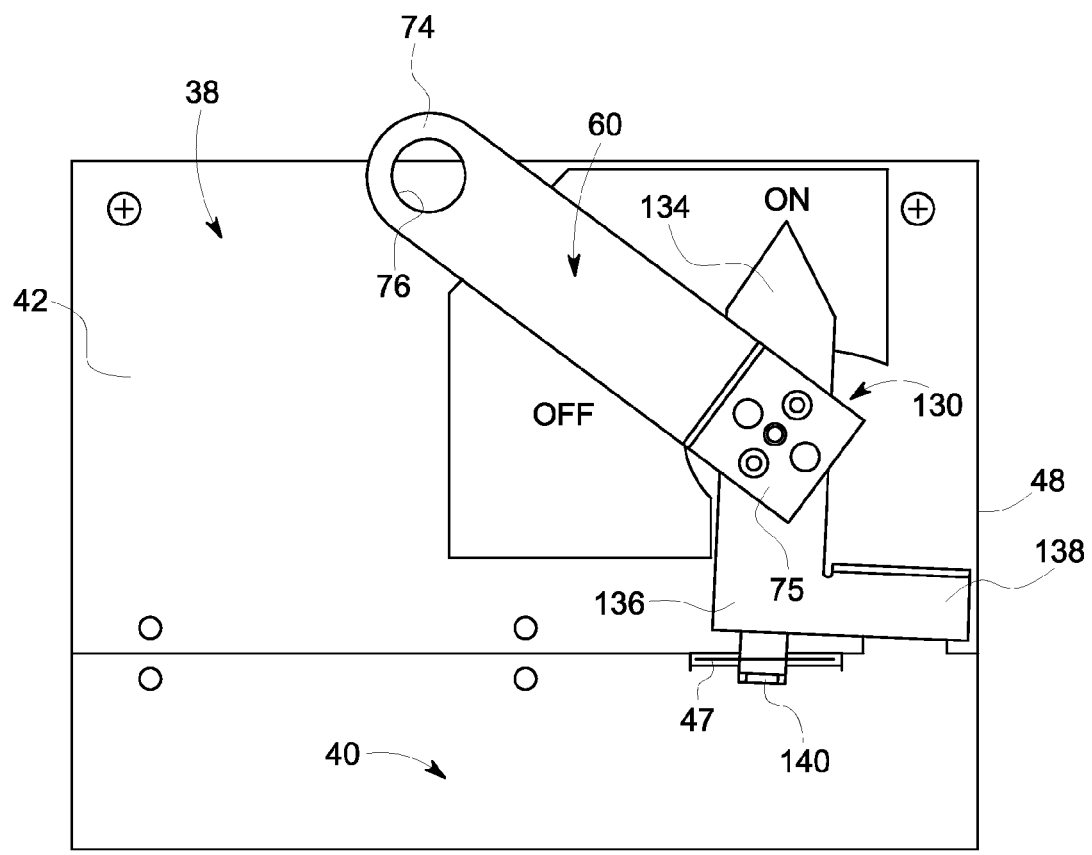
FIG. 4 is a plan view of a position indicator member of the handle operating mechanism of FIG. 1 indicating a first switch position.
Figure 5:
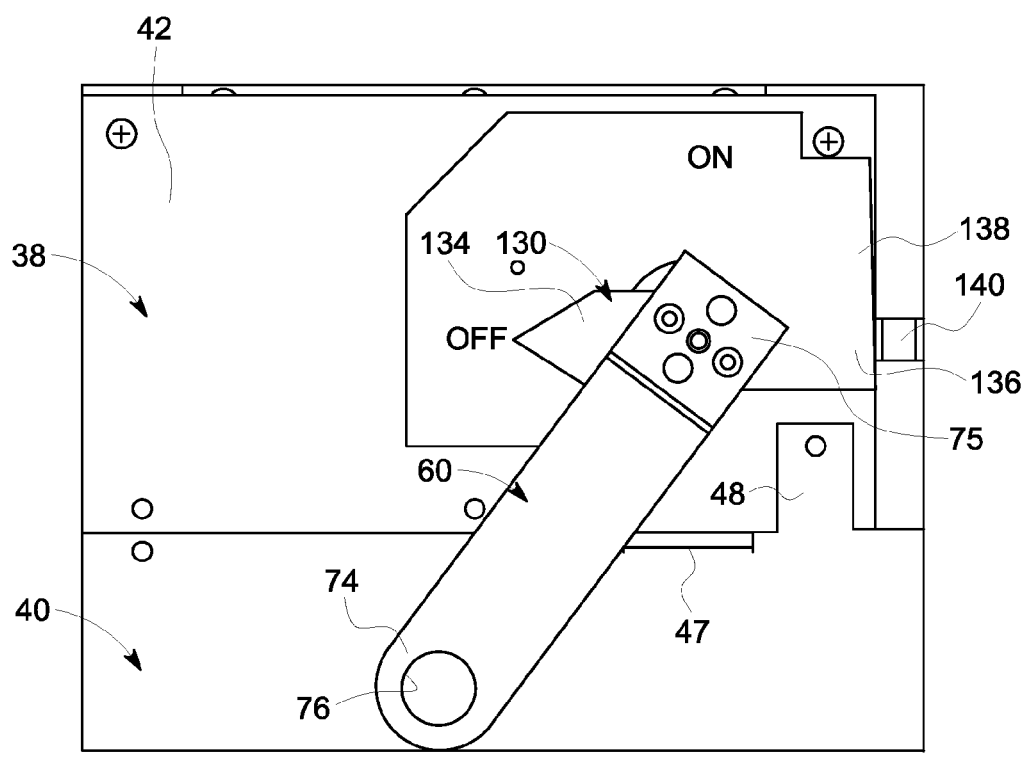
FIG. 5 is a plan view of a position indicator member of the handle operating mechanism of FIG. 1 indicating a second switch position.

In further accordance with an exemplary embodiment, handle operating mechanism 50 includes a position indicator member 130 mounted for rotation with handle member 60. Position indicator member 130 includes a first or indicator end section 134 that extends to a second end section 136. Second end section 136 includes an arm section 138 and an interlock element 140. Position indicator member 130 is configured to indicate a connection state of switching mechanism 26. That is, when handle member 60 is moved to a first or connect position such as shown in FIG. 4, first end section 130 indicates an "ON" or "CONNECT" state of switching mechanism 26. When in the connect position, arm section 138 overlaps tab 48 on second cover member 40. In addition, interlock element 140 engages with interlock member 47 on second cover member 40. In this manner, arm section 138 and interlock element 140 prevent access to interior chamber 15 when electricity flows through switching mechanism 26. When handle member 60 is rotated to the second or disconnect position such as shown in FIG. 5, first end section 130 indicates an "OFF" or DISCONNECT" state of switching mechanism 26. In the second position, both arm section 138 and interlock element 140 disengage from second cover member 40 thereby allowing access to interior cavity 15.

At this point it should be understood that the exemplary embodiments describe a disconnect system having a busplug enclosure provided with a cover mounted handle operating mechanism. Integration of the handle operating mechanism with the cover provides personnel with an opportunity to more closely mount adjacent disconnects. In addition, the incorporation of the handle operating mechanism with the cover allows for a more robust interlock system that is configured to selectively prevent access to the busplug enclosure. Finally, while shown and described as a two-position disconnect, the particular type of switching mechanism may vary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A busplug enclosure comprising:
   a body member including a plurality of wall members that collectively define an interior chamber having an opening, the body member including a line portion and a load portion;
   a cover assembly mounted to the body member across the opening, the cover assembly including a first cover member spanning the load portion and a second cover member spanning the line portion;
   a handle operating mechanism mounted to the cover assembly, the handle operating mechanism including a handle member configured to rotate about an axis extending through the cover assembly, a cam member and a slider member, the handle member being operatively coupled to the cam member and the slider member and configured and disposed to move between a first position and a second position; and
   an indicator member coupled to the handle member, the indicator member providing a first indication when the handle member is in the first position and a second indication when the handle member is in the second position, wherein the second cover member includes an interlock member configured and disposed to receive the indicator member when the handle member is in one of the first and second positions.

2. The busplug enclosure according to claim 1, further comprising a switching mechanism operatively coupled to the handle operating mechanism, the slider member including a fork member configured to engage with the switching mechanism.

3. The busplug enclosure according to claim 1, wherein the handle operating mechanism is mounted to the first cover member.

4. The busplug enclosure according to claim 1, further comprising: a barrier support spanning the opening, the barrier support supporting each of the first and second cover members.

5. The busplug enclosure according to claim 1, wherein the cam member includes a post element configured and disposed to engage with the slider member.

6. The busplug enclosure according to claim 1, further comprising: first and second guide members mounted to the cover, the first and second guide members being configured and disposed to constrain movement of the slider member along a single axis.

7. An electrical disconnect system comprising:
a busplug enclosure including a body member having a plurality of wall members that collectively define an interior chamber provided with an opening, the body member including a line portion and a load portion;
an electrical disconnect arranged within the interior chamber, the electrical disconnect including a switching mechanism that is configured to pivot about a first axis between a first position and a second position;
a cover assembly mounted to the body member across the opening, the cover assembly including a first cover member spanning the line portion and a second cover member spanning the load portion;
a handle operating mechanism mounted to the cover assembly, the handle operating mechanism including a handle member configured to rotate about a second axis extending through the cover assembly, a cam member and a slider member, the handle member being operatively coupled to a cam member and a slider member, the slider member being configured to operatively engage with the electrical disconnect, to shift the switching mechanism between the first position and the second position; and
an indicator member coupled to the handle member, the indicator member providing a first indication when the switching mechanism is in the first position and a second indication when the switching mechanism is in the second position, wherein the second cover member includes an interlock member configured and disposed to receive the indicator member when the handle member is in one of the first and second positions.

8. The electrical disconnect system according to claim 7, comprising a switching mechanism operatively coupled to the handle operating mechanism, the slider member including a fork member configured to engage with the switching mechanism.

9. The electrical disconnect system according to claim 7, wherein the handle operating mechanism being mounted to the first cover member.

10. The electrical disconnect system according to claim 7, a barrier support spanning the opening, the barrier support supporting each of the first and second cover members.

11. The electrical disconnect system according to claim 7, wherein the cam member includes a post element configured and disposed to engage with the slider member.

12. The electrical disconnect system according to claim 7, further comprising: first and second guide members mounted to the cover assembly, the first and second guide members being configured and disposed to constrain movement of the slider member along a single axis.

13. A method of operating an electrical disconnect housed in a busplug enclosure having a cover and a handle member mounted to the cover, the method comprising:
rotating a handle member about a first axis that extends through a cover assembly including a first cover member and a second cover member from a first position to a second position;
rotating a cam member operatively coupled to the handle member about the first axis;
shifting a slider member operatively coupled to the cam member along a second axis, the second axis extending substantially perpendicularly relative to the first axis;
moving a handle operating mechanism operatively coupled to the slider member from one of a connect position and a disconnect position to another of a connect position and a disconnect position;
rotating a position indicator member operatively coupled to the handle member; and
engaging an interlock member on the second cover member with the position indicator member as the handle member rotates toward the connect position locking the cover assembly.

14. The method of claim 13, further comprising: unlocking the cover assembly when the handle member rotates toward the disconnect position.

* * * * *